United States Patent [19]
Kaku et al.

[11] Patent Number: 6,049,873
[45] Date of Patent: Apr. 11, 2000

[54] SCRAMBLED INFORMATION TRANSMITTING AND RECEIVING METHOD

[75] Inventors: Yasuichi Kaku, Iruma; Masaharu Kizaki, Oume; Takao Kanke, Akishima; Naruhiko Nihira, Tokyo, all of Japan

[73] Assignees: Casio Computer Co., Ltd.; Tokyo FM Broadcasting Co., Ltd., both of Tokyo, Japan

[21] Appl. No.: 08/860,740

[22] PCT Filed: Oct. 17, 1996

[86] PCT No.: PCT/JP96/03006

§ 371 Date: Jun. 12, 1997

§ 102(e) Date: Jun. 12, 1997

[87] PCT Pub. No.: WO97/15132

PCT Pub. Date: Apr. 24, 1997

[30] Foreign Application Priority Data

Oct. 19, 1995 [JP] Japan .................................. 7-271228

[51] Int. Cl.$^7$ ...................................... H04N 1/413
[52] U.S. Cl. ..................... 713/171; 380/264; 380/283
[58] Field of Search ....................... 713/171, 182; 380/264, 278, 281, 283, 45

[56] References Cited

U.S. PATENT DOCUMENTS 5,144,663  9/1992  Kudelski et al. .
5,740,246  4/1998  Saito ......................................... 380/21

FOREIGN PATENT DOCUMENTS 0 732 813   9/1996   European Pat. Off. .
0 741 461  11/1996   European Pat. Off. .
6-132916   5/1994   Japan .
WO 93/07715  4/1993   WIPO .

OTHER PUBLICATIONS

H. G. Stork et al; "Broadcasting Classified Information"; 1989; pp. 839–844; Information Processing.
S. Tashiro; "Implementation of a Small–Scale Prototype for Software Service System (SSS)"; 1988; pp. 50–60; Systems and Computers in Japan, vol. 19, No. 5.
C. Bergstrom; "Correction Data for Navstar Global Positioning System Transmitted in the RDS Channel . . . "; 1994; pp.3/1–3/5; IEEE, Savoy Place, London.
E. Sawabe; "Japanese Terrestrial and Satellite Broadcasting Technology—Present & Future"; 1990; pp. 31–35; Space Communications 8.

*Primary Examiner*—Thomas R. Peeso
*Attorney, Agent, or Firm*—Frishauf, Holtz, Goodman, Langer & Chick, P.C.

[57] ABSTRACT

A service information receiving apparatus (1) for receiving scrambled charged service information transmitted as being multiplexed on an FM broadcast radio wave from an FM broadcasting station (3) causes a control section (43) to perform a predetermined arithmetic operation by using a variable key as one of descramble keys affixed to the scrambled charged service information received by a service information receiving section (40) and a half-fixed key as one of descramble keys, which is stored in an IC card (2) detachably attached to a receiving apparatus main body, thereby preparing a new descramble key, which is used to descramble the received charged service information.

37 Claims, 18 Drawing Sheets

FIG.6

CHARGED SERVICE INFORMATION

| PACKET NUMBER | DATA BLOCK | | | |
|---|---|---|---|---|
| 0 | PROGRAM NUMBER | CHARGE CODE | VARIABLE CODE | |
| 1 | SCRAMBLED DATA ||||
| 2 | SAME AS ABOVE ||||

CHARGE-FREE SERVICE INFORMATION

| PACKET NUMBER | DATA BLOCK | | |
|---|---|---|---|
| 0 | PROGRAM NUMBER | CHARGE -FREE CODE | |
| 1 | |||
| 2 | |||

:

6,049,873

SCRAMBLED INFORMATION TRANSMITTING AND RECEIVING METHOD

TECHNICAL FIELD

The present invention relates to an information transmitting method of transmitting scrambled information, an information receiving method of receiving scrambled information, and a system and an apparatus used for performing those methods. More particularly, this invention is particularly suitable for use in an FM (Frequency Modulation) teletext broadcasting system, but is no way limited to such application.

BACKGROUND ART

There is a service which uses FM broadcast radio waves as media to transmit service information, such as character information, multiplexed on an FM broadcast radio wave and display the service information on display means provided on a FM radio receiver. This service is called "FM teletext broadcasting" which has already been put to a practical use as visual information radio.

According to this FM teletext broadcasting, an FM teletext broadcast radio wave is acquired by frequency-multiplexing display information such as characters and/or numerals on an ordinary FM broadcast radio wave. The acquired FM telecast broadcast radio wave is transmitted from an FM broadcasting station. The FM teletext broadcast radio wave is received by an FM radio receiver with a display like a liquid crystal display and is separated to audio information and display information. The display information is converted to character codes to be displayed on the display to allow a user to see this display information. Accordingly, the user can see information associated with broadcasting, such as the title of a broadcast music piece, the name of the artist, comments and/or the number of requests, and news, weather information, traffic information or the like, which is not directly associated with broadcasting, as character information.

In FM teletext broadcasting, there is specific service information which may be charged as well as charge-free service information. Such charged service information is scrambled on the FM broadcasting station and is transmitted. While a receiver of a subscriber for charged broadcast programs is provided with means for storing or inputting a descramble key to descramble (decode) scrambled information so that charged service information can be descrambled for visual purpose.

If anyone who is not subscribed for charged broadcasting decodes the descramble key to descramble charged service information, however, unauthorized watching of the charged service information becomes possible.

DISCLOSURE OF INVENTION

It is therefore an object of the present invention to provide an FM teletext broadcast receiving apparatus, an information transmitting and receiving system and an information receiving apparatus, which can surely inhibit an unauthorized use of charged information services.

To achieve this object, according to one preferable mode of this invention, an information receiving apparatus comprises reception means for receiving scrambled information and a first descramble key for descrambling the scrambled information; a receiving apparatus main body to and from which a storage medium having stored a second descramble key for descrambling the scrambled information is attachable and detachable; descramble means for descrambling the scrambled information received by the reception means by using a plurality of descramble keys including the first and second descramble keys; and display means for displaying the information descrambled by the descramble means. This structure can surely prevent an unauthorized use of charged information services.

According to another preferable mode of this invention, an information transmitting apparatus comprises scramble means for scrambling information by using a plurality of scramble keys; and transmission means for transmitting scrambled information scrambled by the scramble means and transmitting at least one of the plurality of scramble keys as a descramble key, thereby surely preventing an unauthorized use of charged information services.

According to a further preferable mode of this invention, an information transmitting and receiving system comprises an information transmitting apparatus for transmitting scrambled information and a first descramble key for descrambling the scrambled information; a storage medium having stored a second descramble key for descrambling the scrambled information; and an information receiving apparatus to which the storage medium for receiving the scrambled information and the first descramble key transmitted from the information transmitting apparatus is attachable, the information receiving apparatus including storage means for storing a third descramble key for descrambling the scrambled information, descramble means for descrambling the received scrambled information by using the first and second descramble keys and the third descramble key stored in the storage means, and display means for displaying information descrambled by the descramble means. This system structure can surely prevent an unauthorized use of charged information services.

According to a still further preferable mode of this invention, a storage medium which is attachable to and detachable from an information receiving apparatus for receiving scrambled information, comprises storage means for storing at least one of a plurality of descramble keys for descrambling the scrambled information received by the information receiving apparatus; and interface means for interfacing with the information receiving apparatus, thereby surely preventing an unauthorized use of charged information services.

BRIEF DESCRIPTION OF DRAWINGS

FIG. 6 is a diagram showing the transmission signal format of charged service information which is multiplexed on an FM broadcast radio wave according to this embodiment;

FIG. 7 is a diagram showing the transmission signal format of charge-free service information which is multiplexed on an FM broadcast radio wave according to this embodiment;

BEST MODES FOR CARRYING OUT THE INVENTION

First Embodiment

The first embodiment of the present invention as adapted to an FM teletext broadcasting system will now be described referring to the accompanying drawings.

Figure 1:
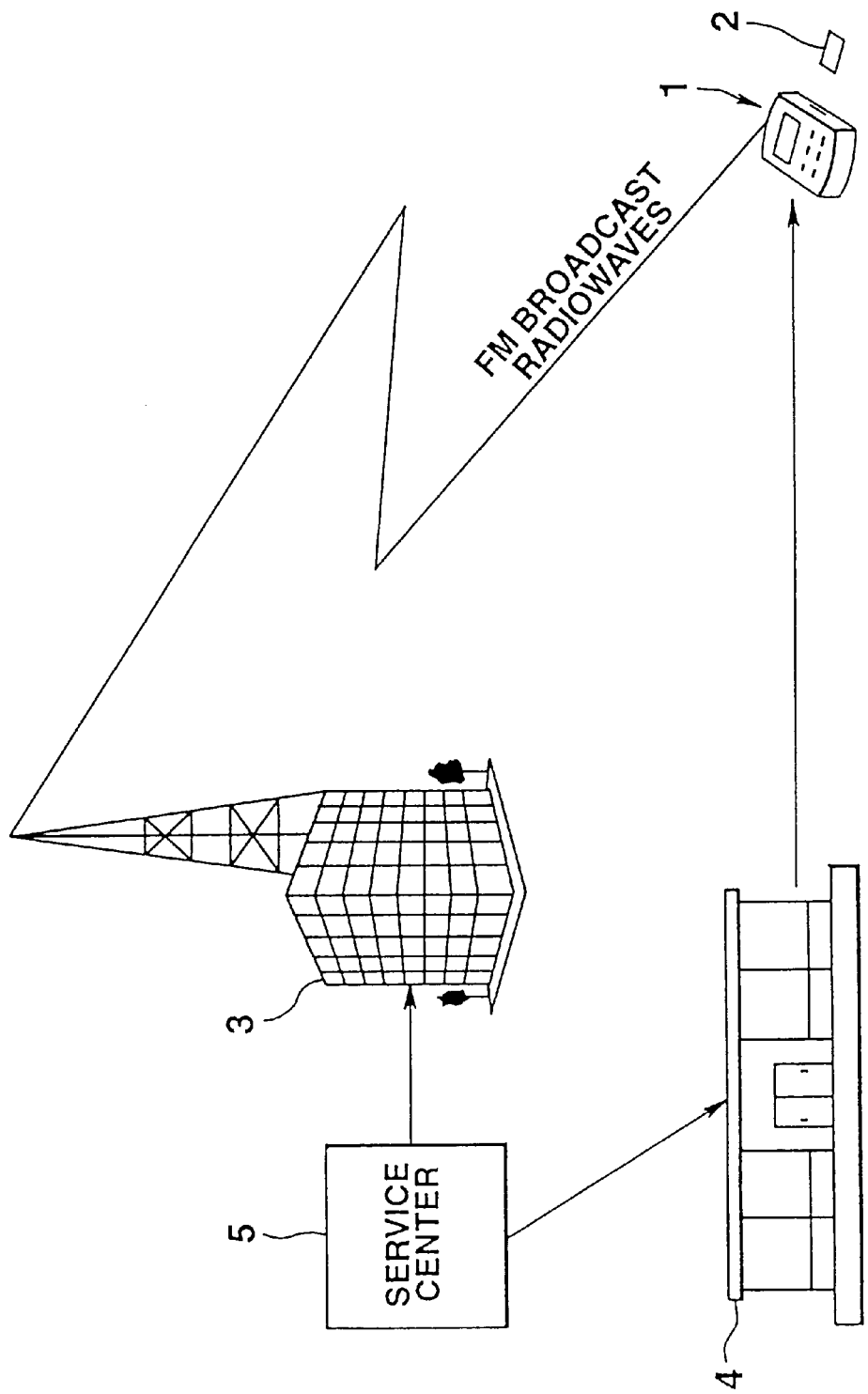
FIG. 1 is a diagram illustrating the general structure of an FM teletext broadcasting system according to the first embodiment of this invention.

FIG. 1 shows the structure of the entire system. This system includes an FM broadcasting station 3 which is a service provider to transmit FM broadcast radio waves on which charged and charge-free service information are multiplexed, a service information receiving apparatus 1 for receiving FM broadcast radio waves from the FM broadcasting station 3, an IC (Integrated Circuit) card 2 as an information storage medium which is attachable to and detachable from the service information receiving apparatus 1 and is used at the time charged service information is received, and a store 4 like a convenience store which sells the IC cards 2. The store 4 has a predetermined contract or the like with a service center 5 for selling the IC cards 2.

The service center 5 is a company which produces charged programs or charged service information as well as a company which issues IC cards 2. Charge programs produced by this service center 5 are sent as charged service information to the FM broadcasting station 3, which transmits the charged programs together with charge-free programs or charge-free service information produced by the FM broadcasting station 3 or the like.

The transfer of charged service information to the FM broadcasting station 3 from the service center 5 can be accomplished by various ways, such as wire broadcasting, radio communication or by means of a magnetic tape on which such charged service information is recorded.

The structures of the service information receiving apparatus 1 and the IC card 2 will now be discussed using FIGS. 2 through 4.

Figure 2:
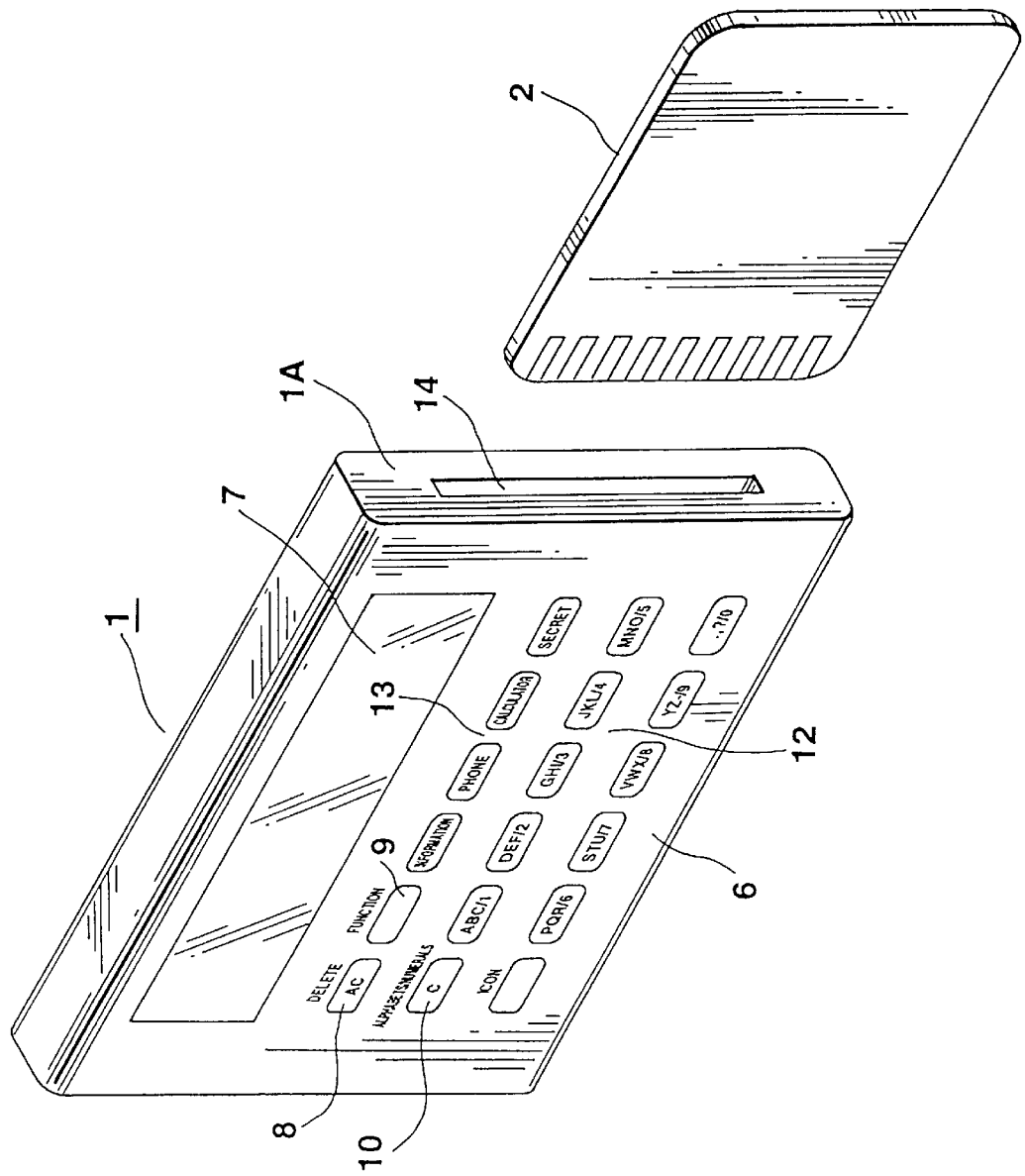
FIG. 2 is a perspective view showing the external structures of a service information receiving apparatus and an IC card according to this embodiment.

FIG. 2 exemplifies the external structures of the service information receiving apparatus 1 and the IC card 2. A key input section 6 and a display section 7 as display means to display service information or the like are provided on the top of an apparatus main body 1A having a nearly parallelepiped shape.

The key input section 6 has a character delete key 8, a function select key 9, an alphabet/numeral select key 10 for selecting alphabets or numerals, an icon key 11, alphabet/numeral input keys 12 for inputting alphabets "A" to "Z" or numerals "1" to "0" and mode keys 13 for selecting modes such as information bank, telephone, calculator and secret.

The apparatus main body 1A has a slot 14 provided in one side surface where the IC card 2 as an information storage medium is to be loaded, and has a reception tuning dial, a stereo headphone jack, a volume dial, a power switch, etc. provided on the opposite side (not shown).

Figure 3:
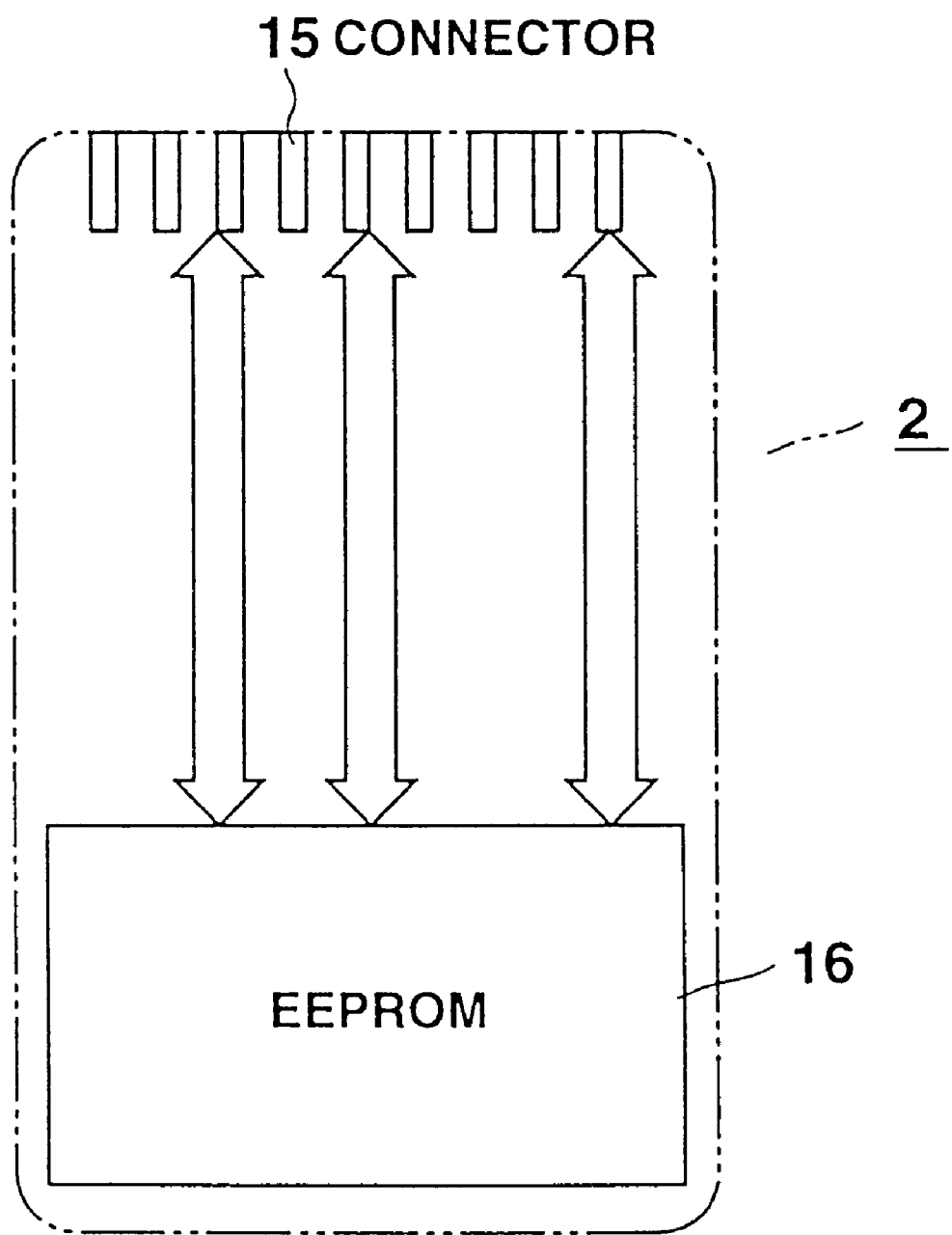
FIG. 3 is a diagram depicting the internal structure of the IC card according to this embodiment.

FIG. 3 exemplifies the internal structure of the IC card 2. As illustrated in FIG. 2, a plurality of, e.g., nine connectors 15 are laid out at one end of the outer surface of the IC card 2 or the distal end side of the IC card 2 which is to be loaded into the service information receiving apparatus 1. The IC card 2 loaded into the service information receiving apparatus 1 exchanges data with the service information receiving apparatus 1 via the connectors 15.

An EEPROM (Electrically Erasable and Programmable Read Only Memory) 16 which is a non-volatile memory is provided inside the IC card 2. A half-fixed key (to be discussed later), which is one of descramble keys used to descramble at the time of receiving charged service information, is stored in this EEPROM 16. This half-fixed key is read out to the service information receiving apparatus 1 via the connectors 15 of the IC card 2 loaded in the receiving apparatus 1.

Although this embodiment is so designed that the half-fixed key read from the EEPROM 16 is sent directly to the service information receiving apparatus 1 via the connectors 15, a CPU (Central Processing Unit) may be provided between the EEPROM 16 and the connectors 15 to control the reading of the half-fixed key.

Figure 4:
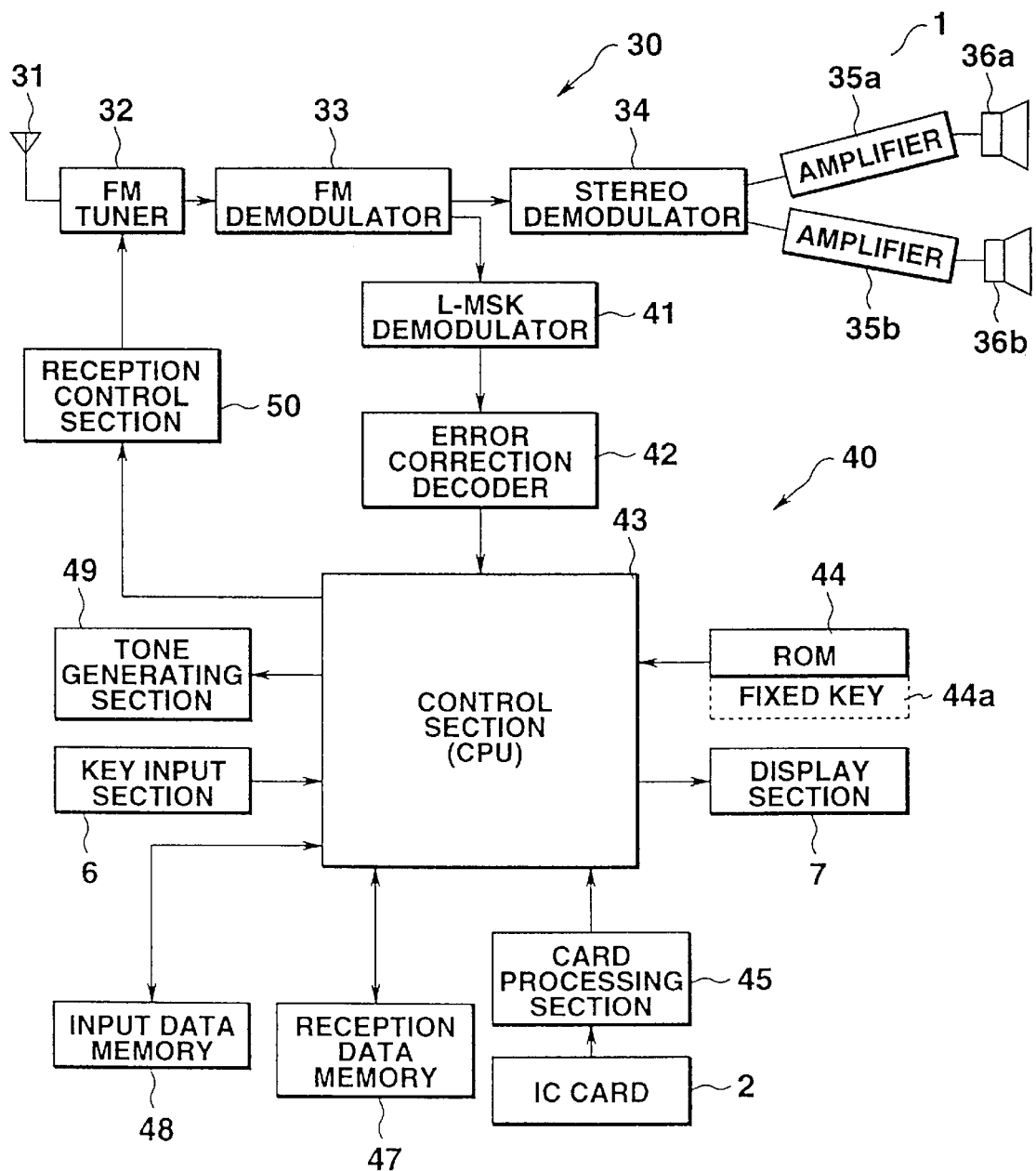
FIG. 4 is a block diagram mainly showing the internal circuit structure of the service information receiving apparatus according to this embodiment.

FIG. 4 shows the internal circuit structure of the service information receiving apparatus 1. In this diagram, the service information receiving apparatus 1 has an FM broadcast receiving section 30, which receives FM broadcast radio waves and generates corresponding sounds, and a service information receiving section 40, which performs various processes with respect to the reception of charged and charge-free service information multiplexed on an FM broadcast radio wave received by the FM broadcast receiving section 30.

The FM broadcast receiving section 30 includes an antenna 31 for receiving FM broadcast radio waves, an FM tuner 32 for tuning FM broadcast radio waves, an FM demodulator 33 for demodulating an FM signal acquired through the FM tuner 32, a stereo demodulator 34 for demodulating the demodulated FM signal to stereo signals, a pair of amplifiers 35a and 35b for amplifying the output signals of the stereo demodulator 34, and a pair of loudspeakers 36a and 36b which outputs sounds in response to the signals amplified by those amplifiers 35a and 35b. When a stereo headphones are connected to the stereo headphone jack, a user can listen to an FM stereo broadcast program through the headphones.

The service information receiving section 40 has an L-MSK (Level controlled Minimum Shift Keying) demodulator 41 connected to the FM demodulator 33, an error correction decoder 42 and a control section 43. The L-MSK demodulator 41 separates service information, digitally modulated in such a way that the levels of the multiplexed signals are changed by 4% to 10% in accordance with the modulation levels of the FM stereo signals L and R and multiplexed on an FM broadcast radio wave, and demodulates the separated service information. The control section 43 performs various processes including descrambling of the demodulated service information.

Connected to this control section 43 are a ROM (Read Only Memory) having stored processing programs for the control section 43, the aforementioned key input section 6, the aforementioned display section 7, a card processing section 45 for executing information reading from the IC card 2, a reception data memory 47 for storing received data (received information), an input data memory 48 for storing input data (input information) from the key input section 6, a tone generating section 49 like a buzzer for generating an alarm in accordance with the results of the processing by the control section 43, and a reception control section 50 which performs reception tuning of the FM tuner 32 in accordance with the manipulation of the reception tuning dial.

The control section 43, constituted of a CPU or the like, performs a predetermined arithmetic operation using the half-fixed key read from the IC card 2 via the card processing section 45 and a variable key (to be discussed later), affixed to charged service information received via the L-MSK demodulator 41 and the error correction decoder 42, to thereby prepare a new descramble key for descrambling scrambled information. The control section 43 performs a process to descramble charged service information using this new descramble key and displays acquired charged descrambled information on the display section 7.

Figure 5:
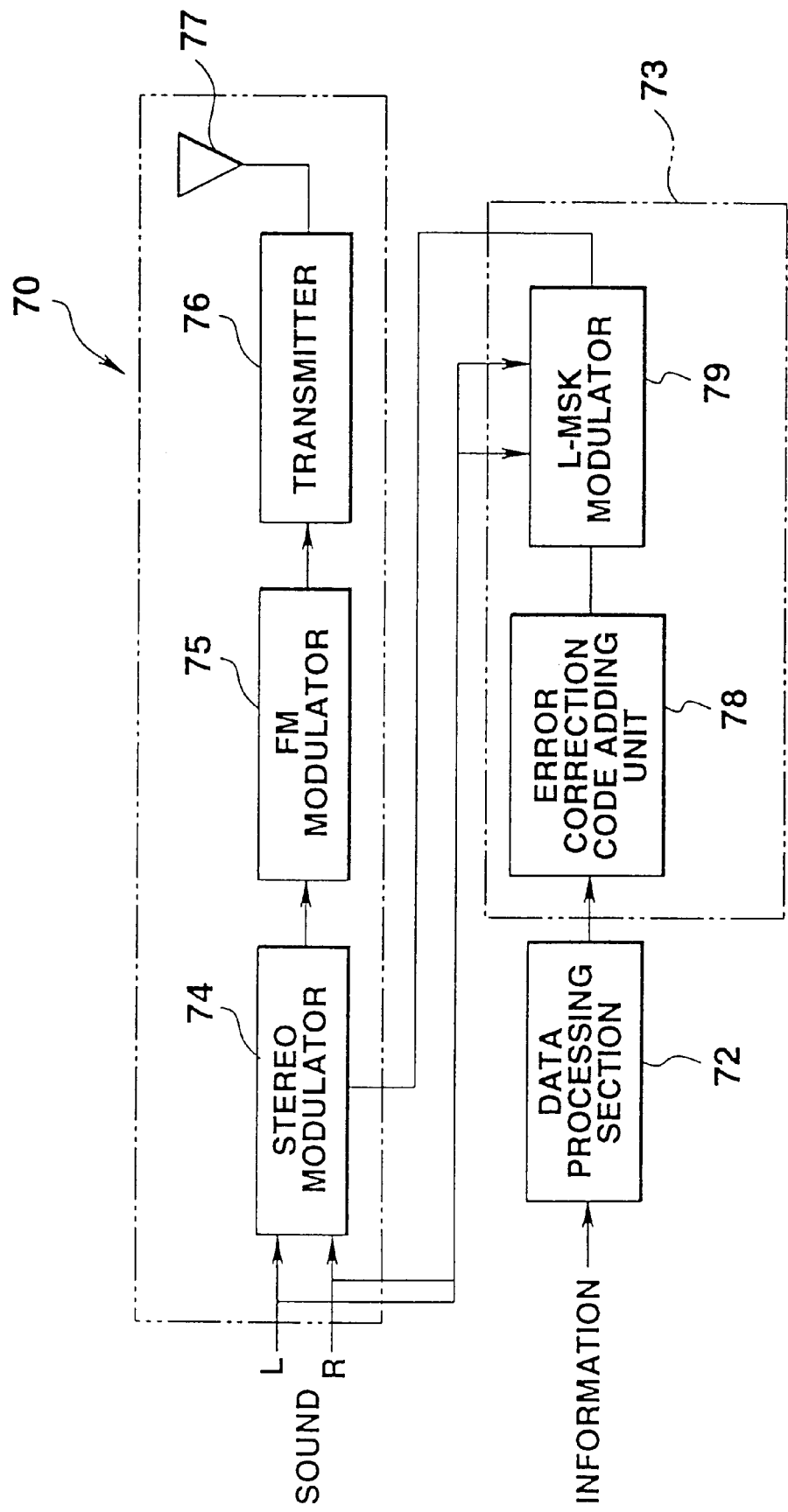
FIG. 5 is a block diagram showing the circuit structure of a service information transmitting apparatus according to this embodiment, which is located in an FM broadcasting station.

FIG. 5 shows the structure of a service information transmitting apparatus 70 located in the FM broadcasting station 3. This service information transmitting apparatus 70 has a transmitting section 71, a data processing section 72 and a multiplexing section 73.

The transmitting section 71 includes a stereo modulator 74 for performing stereo modulation of voice information, an FM modulator 75 for FM modulation of modulated stereo signals, and a transmitter 76 for transmitting the modulated FM signals as FM broadcast radio waves from an antenna 77.

The data processing section 72 performs various processes, such as a process to affix predetermined data to input charged and charge-free service information and a process to scramble (encode) charged service information.

The multiplexing section 73 includes an error correction code adding unit 78 for affixing an error correction code to charged and charge-free service information, which has been processed by the data processing section 72, and an L-MSK modulator 79 for subjecting the service information affixed with the error correction code to digital modulation in which the levels of multiplexed signals are changed by 4% to 10% in accordance with the modulation levels of the FM stereo signals L and R, so that the service information is multiplexed on the stereo signals.

The transmission signal format of charged service information which is to be multiplexed on the FM broadcast radio wave will be described with reference to FIG. 6. FIG. 6 shows the transmission signal format of charged service information; a packet number at the head indicates the number of a packet assigned to each service information.

In the data block in the packet with the packet number "0," a "program number" representing the type of service information, a "charge code" indicating charged service information and a variable key as one of descramble keys used to descramble scrambled information are provided.

Since the content of this variable key is variably set in accordance with, for example, the date and/or time, the descramble key to be prepared on the reception side can be altered. In packets whose packet number is "1" or more, actual charged service information, which is scrambled, is sequentially arranged in each data block of the packets.

FIG. 7 shows the transmission signal format of charge-free service information. A packet number at the head, like one in FIG. 6, indicates the number of a packet assigned to each service information.

In the data block in the packet with the packet number "0," a "program number" representing the type of service information, a "charge-free code" indicating charge-free service information are provided.

In packets whose packet number is "1" or more, actual charge-free service information, which is not scrambled unlike the charged service information in FIG. 6, is sequentially arranged in each data block of the packets.

The operation of the first embodiment will be described below.

Figure 8:
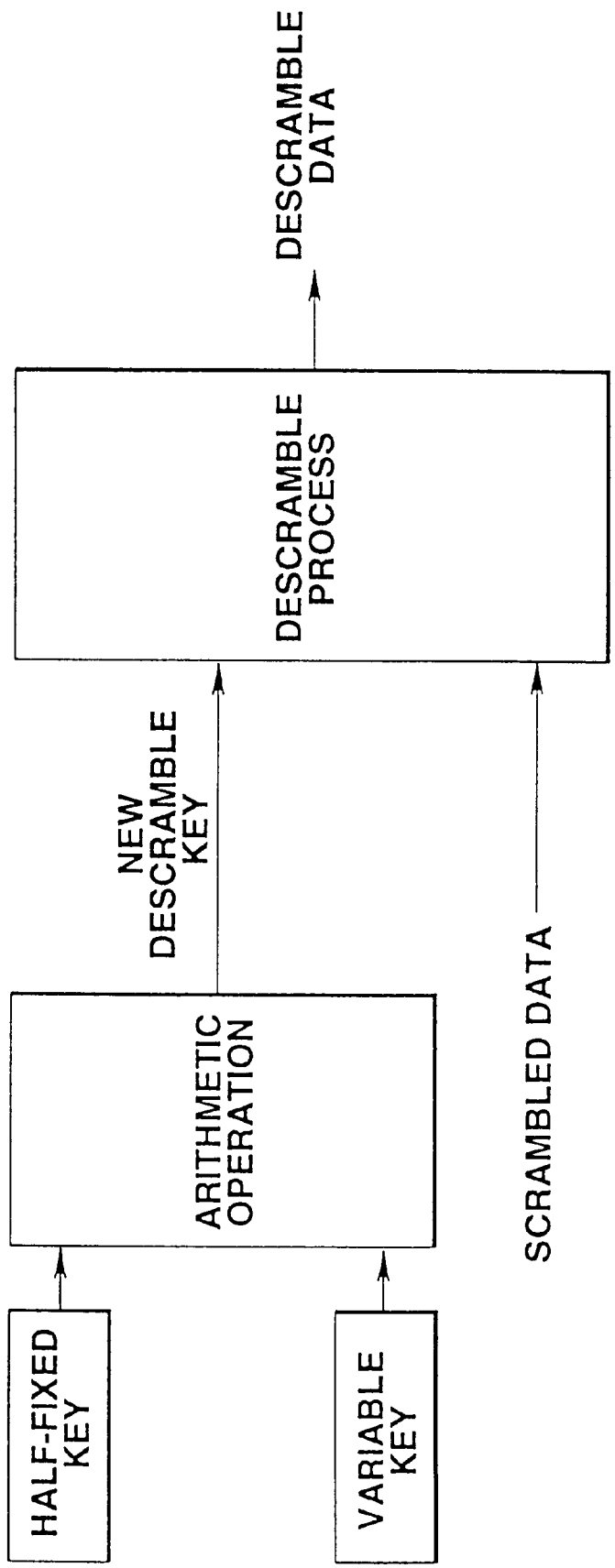
FIG. 8 is a conceptual diagram illustrating a descrambling operation according to this embodiment.

In this embodiment, at the time charged service information is received, as shown in FIG. 8, a predetermined arithmetic operation is performed using the half-fixed key read from the IC card 2 and the variable key (see FIG. 6) in the top packet of the received charged service information to prepare a new descramble key. And the charged service information is descrambled using this new descramble key to acquire descrambled charged service information. The sequence of procedures is illustrated in FIG. 9.

Figure 9:
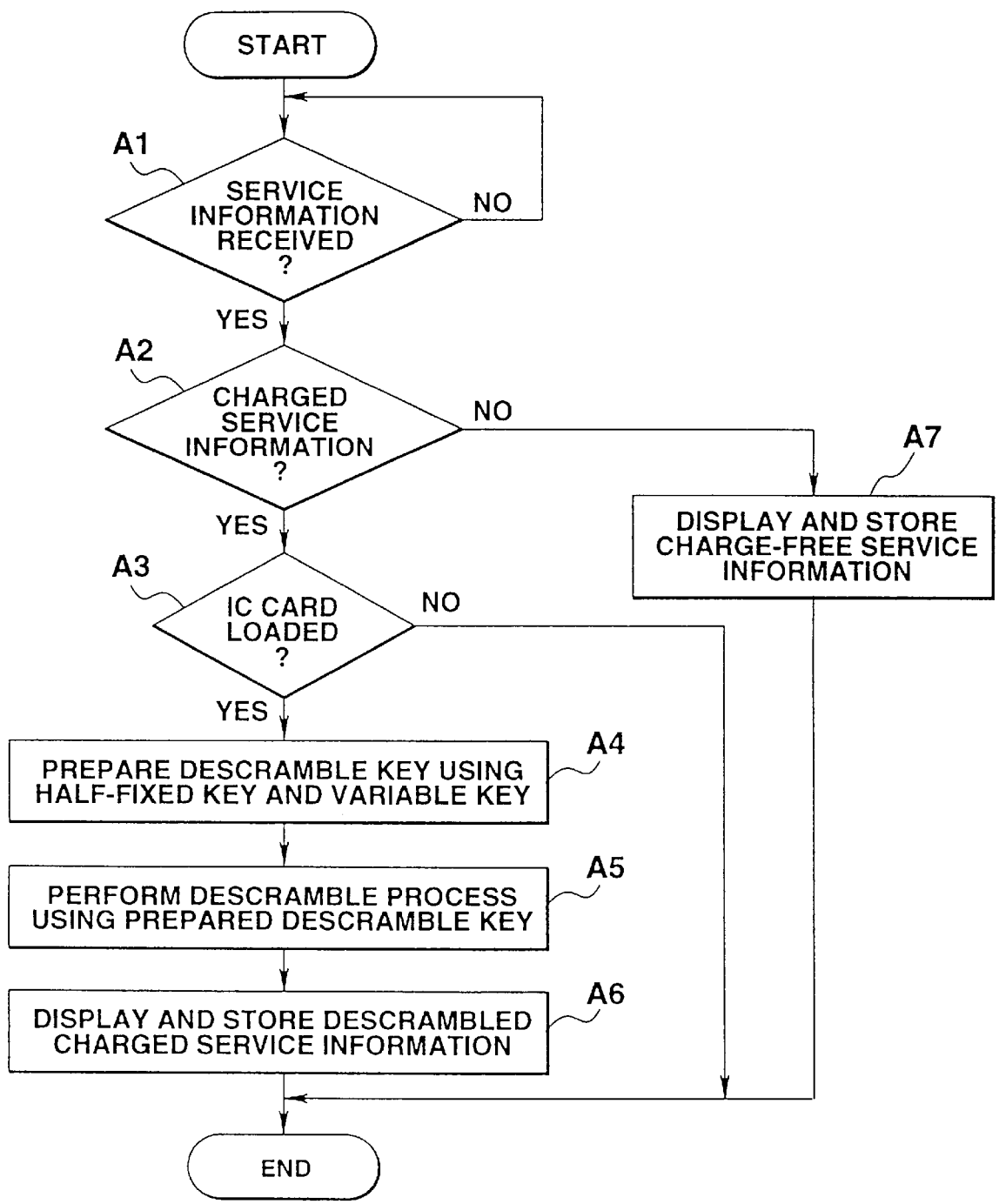
FIG. 9 is a flowchart illustrating the operation of the service information receiving apparatus according to this embodiment.

FIG. 9 exemplifies the operation that the control section 43 performs based on the processing programs stored in the ROM 44 at the time of receiving service information. At the beginning, the control section 45 waits for the reception of service information, regardless of whether it is charged or charge-free type (step A1). After the reception of service information is determined, it is then determined whether or not the service information is charged one by checking a charge code is present in the data block of the packet (step A2).

When it is determined that the charge code is not present in the associated field and a charge-free code is placed there instead so that the received service information is free, not charged, the service information is not scrambled. Therefore, the charge-free service information is sequentially sent directly to the display section 7 to be displayed and is also stored in the reception data memory 47 (step A7).

When it is determined in the aforementioned step A2 that the charge code is located at the associated position and the received service information is charged, it is then determined if the IC card 2 is loaded (step A3).

When it is determined that no IC card 2 is loaded, the half-fixed key cannot be read from the IC card 2, disabling the preparation of a descramble key to descramble the scrambled charged information, so that this reception process is terminated.

When it is determined that the IC card 2 is loaded, on the other hand, the half-fixed key is read from the IC card 2 via the card processing section 45 and a predetermined arithmetic operation is executed using this half-fixed key and the variable key in the top packet of the received charged service information, thereby preparing a new descramble key for descrambling the scrambled information (step A4).

Then, this prepared descramble key is used to descramble the scrambled charged service information to acquire descrambled charged service information (step A5). Subsequently, the acquired charged service information is sequentially sent to the display section 7 to be displayed and is also stored in the reception data memory 47 (step A6).

In short, a predetermined arithmetic operation is performed using the half-fixed key read from the IC card 2 loaded into the service information receiving apparatus 1 and the variable key affixed to received charged service information to prepare a new descramble key, and the descrambling process is executed using this prepared descramble key to acquire descrambled charged service information. It is therefore possible to surely prevent unauthorized viewing of charged service information.

Second Embodiment

With reference to the accompanying drawings, a description will now be given of the second embodiment of this invention as adapted to an FM teletext broadcasting system.

The general system structure, the structure of the service information receiving apparatus, the structure of an IC card to be loaded into this apparatus, the structure of the service information transmitting apparatus which is located in an FM broadcasting station and the transmission signal format of service information to be multiplexed on an FM broadcast radio wave are the same as those illustrated in FIGS. 1 through 7. To avoid the redundant description, therefore, like or same reference numerals are given to those components which are the same as the corresponding components of the first embodiment.

It is assumed that a fixed key 44a, one of descramble keys which is used together with the half-fixed key read from the IC card 2 and the variable key affixed to the received charged service information to descramble charged service information is stored in advance in the ROM 44 in the service information receiving apparatus 1 as indicated by a broken line in FIG. 4.

The operation of the second embodiment will be described below.

Figure 10:
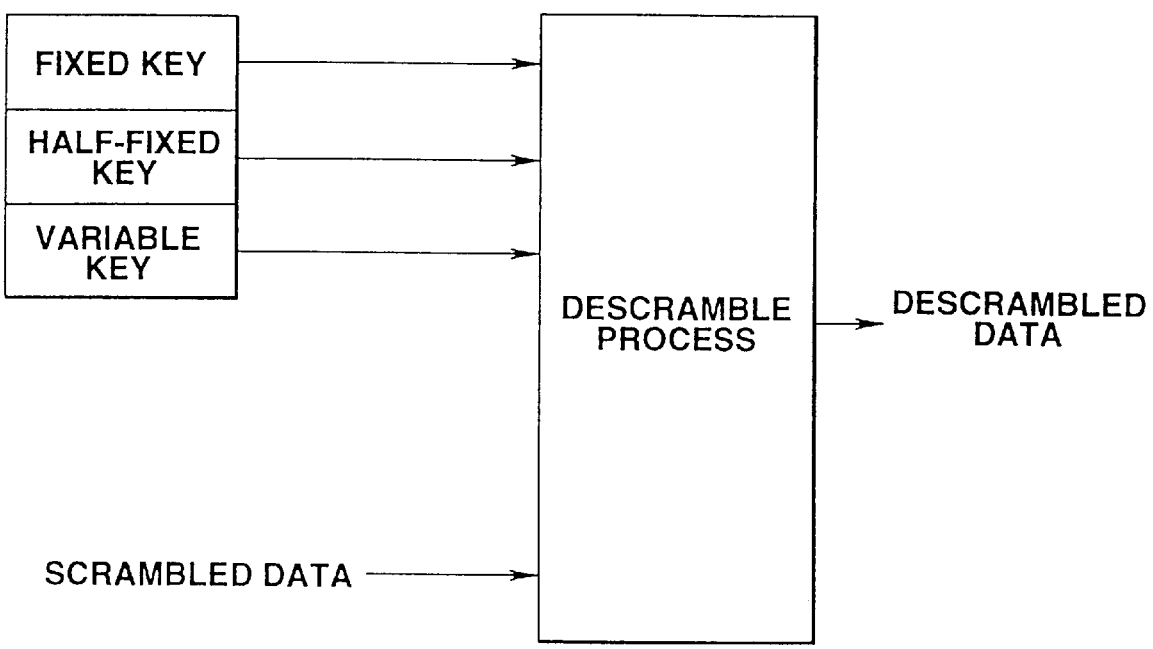
FIG. 10 is a conceptual diagram illustrating a descrambling operation according to the second embodiment of this invention.

In this embodiment, at the time charged service information is received, as shown in FIG. 10, descrambling is performed step by step using the fixed key stored in the ROM 44, the half-fixed key read from the IC card 2 and the variable key in the top packet of the received charged service information to descramble the scrambled charged service information, thus yielding descrambled charged service information. The sequence of procedures is illustrated in FIG. 11.

Figure 11:
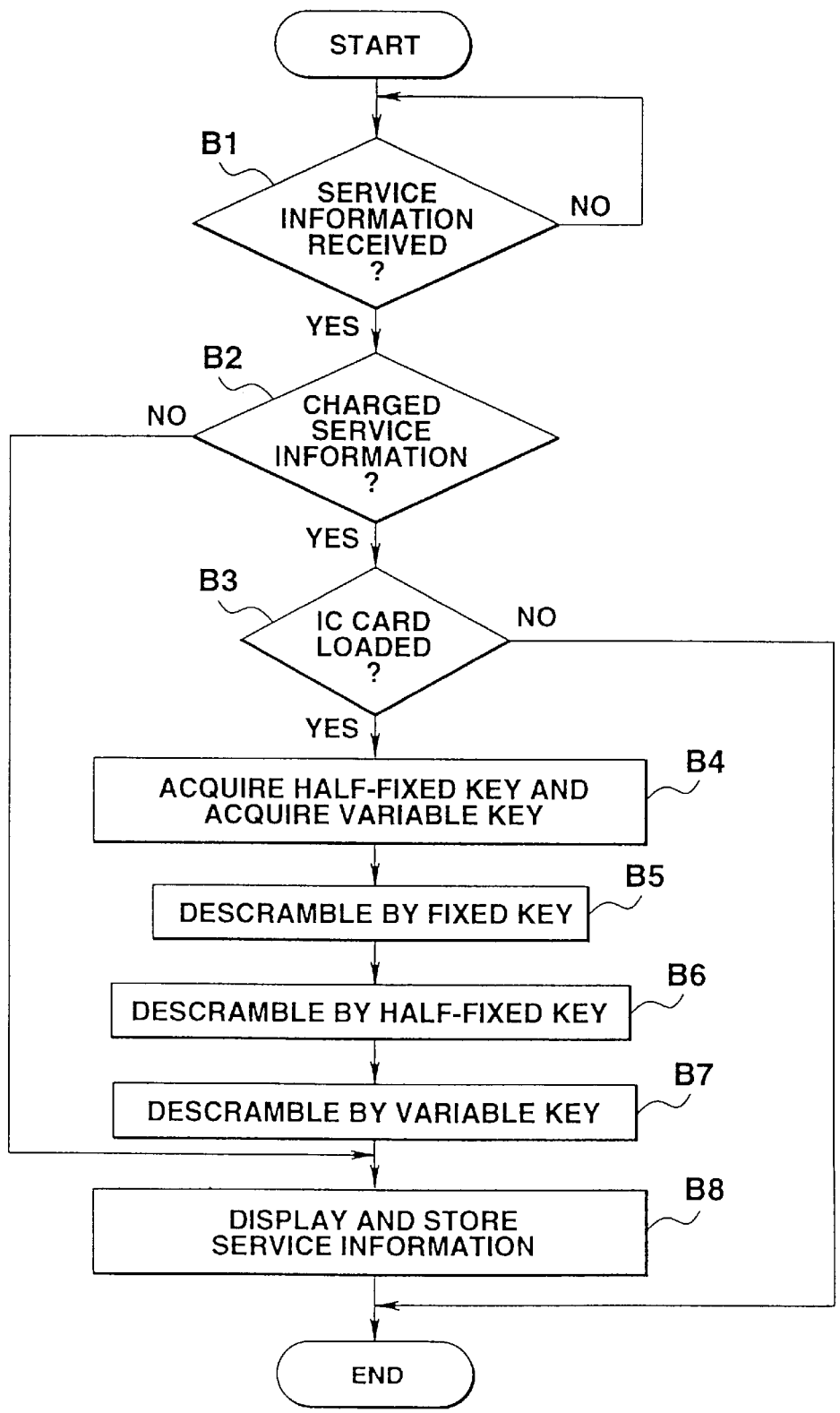
FIG. 11 is a flowchart illustrating the operation of a service information receiving apparatus according to this embodiment.

FIG. 11 exemplifies the operation that the control section 43 performs based on the processing programs stored in the ROM 44 at the time of receiving service information. At the beginning, the control section 45 waits for the reception of service information, regardless of whether it is charged or charge-free type (step B1). After the reception of service information is determined, it is then determined whether or not the service information is charged one by checking a charge code is present in the data block of the packet (step B2).

When it is determined that the charge code is not present in the associated field and a charge-free code is placed there instead so that the received service information is free, not charged, the service information is not scrambled. Therefore, the charge-free service information is sequentially sent directly to the display section 7 to be displayed and is also stored in the reception data memory 47 (step B8).

When it is determined in the aforementioned step B2 that the charge code is located at the associated position and the received service information is charged, it is then determined if the IC card 2 is loaded (step B3).

When it is determined that no IC card 2 is loaded, the half-fixed key cannot be read from the IC card 2, disabling the descrambling of the scrambled charged information, so that this reception process is terminated.

When it is determined that the IC card 2 is loaded, on the other hand, the half-fixed key is read from the IC card 2 via the card processing section 45 and a variable key following the charge code in the top packet of the received charged service information is fetched (step B4).

Then, a first descrambling process is performed on the received charged service information using the fixed key stored in the ROM 44 (step B5), and a second descrambling process is performed on the processed data using the half-fixed key read from the IC card 2 (step B6).

Further, a third descrambling process is performed on the processed data using the variable key affixed to the received charged service information to acquire completely descrambled charged service information (step B7). Next, the acquired charged service information is sequentially sent to the display section 7 to be displayed and is also stored in the reception data memory 47 (step B8), then this processing is terminated.

As apparent from the above, descramble processing is executed step by step using the fixed key prestored in the ROM 44, the half-fixed key read from the IC card 2 loaded into the service information receiving apparatus 1 and the variable key affixed to received charged service information to finally acquire descrambled charged service information. It is therefore possible to surely prevent unauthorized viewing of charged service information.

Third Embodiment

With reference to the accompanying drawings, a description will now be given of the third embodiment of this invention as adapted to an FM teletext broadcasting system.

The general system structure, the structure of the service information receiving apparatus, the structure of an IC card to be loaded into this apparatus, the structure of the service information transmitting apparatus which is located in an FM broadcasting station and the transmission signal format of service information to be multiplexed on an FM broadcast radio wave are the same as those illustrated in FIGS. 1 through 7. To avoid the redundant description, therefore, like or same reference numerals are given to those components which are the same as the corresponding components of the first embodiment.

It is assumed that the fixed key 44a, one of descramble keys which is used together with the half-fixed key read from the IC card 2 and the variable key affixed to the received charged service information to descramble charged service information is stored in advance in the ROM 44 in the service information receiving apparatus 1 as indicated by a broken line in FIG. 4.

The operation of the third embodiment will be described below.

Figure 12:
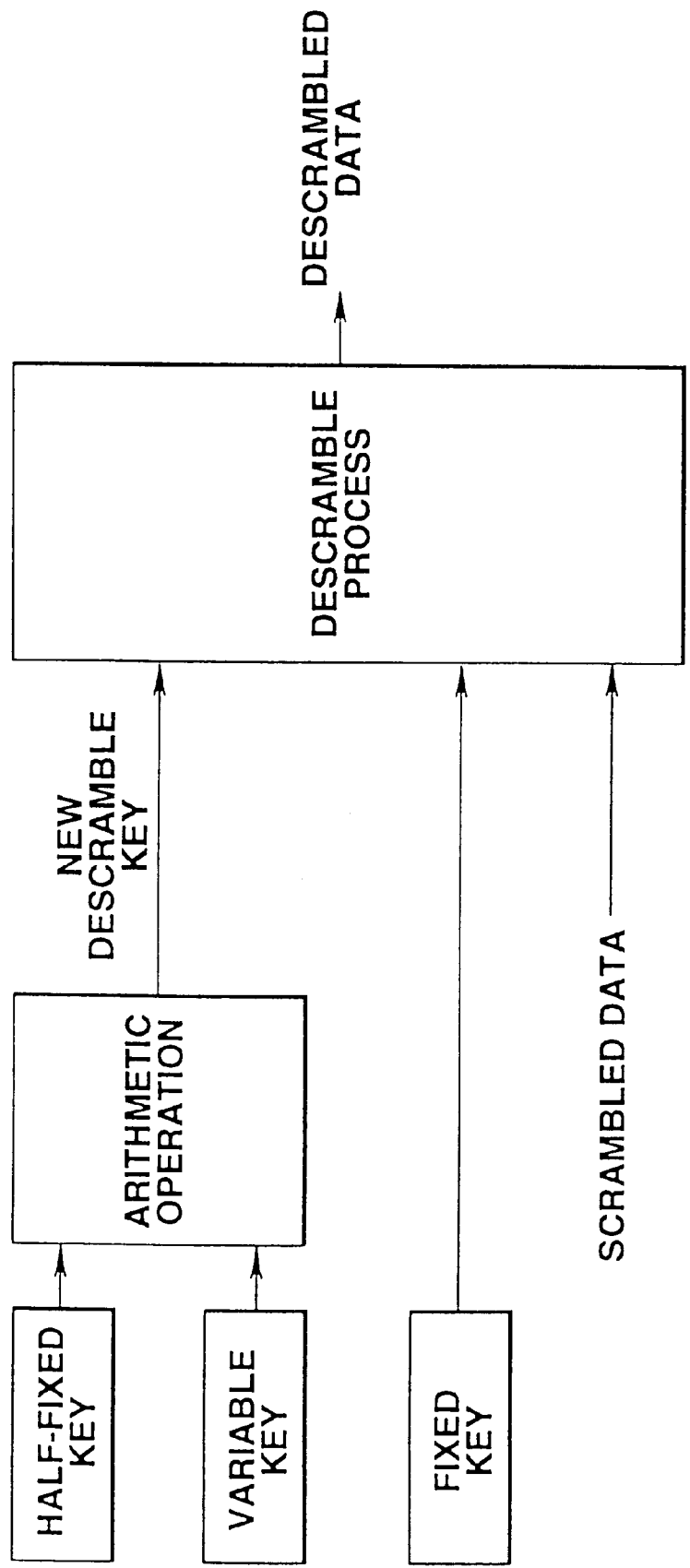
FIG. 12 is a conceptual diagram illustrating a descrambling operation according to the third embodiment of this invention.

In this embodiment, at the time charged service information is received, as shown in FIG. 12, a predetermined arithmetic operation is performed using the half-fixed key read from the IC card 2 and the variable key in the top packet of the received charged service information to prepare a new descramble key, and descrambling is executed step by step using this prepared descramble key and the fixed key stored in the ROM 44 to descramble the scrambled charged service information, thus obtaining descrambled charged service information. The sequence of procedures is illustrated in FIG. 13.

Figure 13:
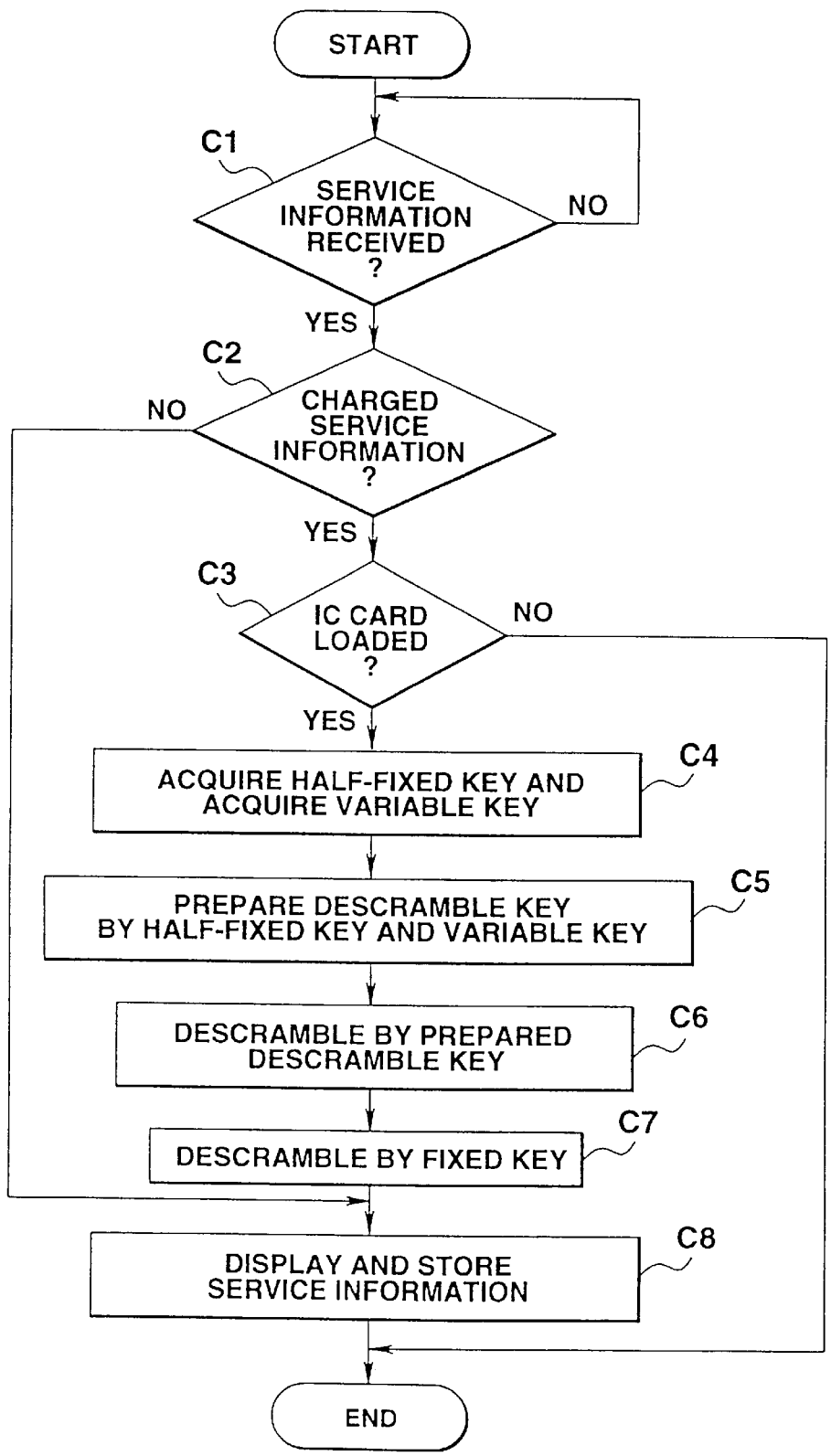
FIG. 13 is a flowchart illustrating the operation of a service information receiving apparatus according to this embodiment.

FIG. 13 exemplifies the operation that the control section 43 performs based on the processing programs stored in the ROM 44 at the time of receiving service information. At the beginning, the control section 45 waits for the reception of service information, regardless of whether it is charged or charge-free type (step C1). After the reception of service information is determined, it is then determined whether or not the service information is charged one by checking a charge code is present in the data block of the packet (step C2).

When it is determined that the charge code is not present in the associated field and a charge-free code is placed there instead so that the received service information is free, not charged, the service information is not scrambled. Therefore, the charge-free service information is sequentially sent directly to the display section 7 to be displayed and is also stored in the reception data memory 47 (step C8).

When it is determined in the aforementioned step C2 that the charge code is located at the associated position and the received service information is charged, it is then determined if the IC card 2 is loaded (step C3).

When it is determined that no IC card 2 is loaded, the half-fixed key cannot be read from the IC card 2, disabling the preparation of a descramble key to descramble the scrambled charged information, so that this reception process is terminated.

When it is determined that the IC card 2 is loaded, on the other hand, the half-fixed key is read from the IC card 2 via the card processing section 45 and a variable key following the charge code in the top packet of the received charged service information is fetched (step C4).

Then, a predetermined arithmetic operation is executed using the acquired half-fixed key and variable key to prepare a new descramble key for descrambling the scrambled information (step C5), and a first descrambling process is performed on the received charged service information using this prepared descramble key (step C6).

Further, a second descrambling process is performed on the processed data using the fixed key stored in the ROM 44 to acquire completely descrambled charged service information (step C7). Subsequently, the acquired charged service information is sequentially sent to the display section 7 to be displayed and is also stored in the reception data memory 47 (step C8), then this processing is terminated.

As apparent from the above, a new descramble key is prepared by using the half-fixed key read from the IC card 2 loaded into the service information receiving apparatus 1 and the variable key affixed to received charged service information, and descramble processing is executed step by step using the prepared descramble key and the fixed key stored in the ROM 44 to finally acquire descrambled charged service information. It is therefore possible to surely prevent unauthorized viewing of charged service information.

Fourth Embodiment

With reference to the accompanying drawings, a description will now be given of the fourth embodiment of this invention as adapted to an FM teletext broadcasting system.

The general system structure, the structure of the service information receiving apparatus, the structure of an IC card to be loaded into this apparatus, the structure of the service information transmitting apparatus which is located in an FM broadcasting station and the transmission signal format of service information to be multiplexed on an FM broadcast radio wave are the same as those illustrated in FIGS. 1 through 7. To avoid the redundant description, therefore, like or same reference numerals are given to those components which are the same as the corresponding components of the first embodiment.

It is assumed that the fixed key 44a, one of descramble keys which is used together with the half-fixed key read from the IC card 2 and the variable key affixed to the received charged service information to descramble charged service information is stored in advance in the ROM 44 in the service information receiving apparatus 1 as indicated by a broken line in FIG. 4.

The operation of the fourth embodiment will be described below.

Figure 14:
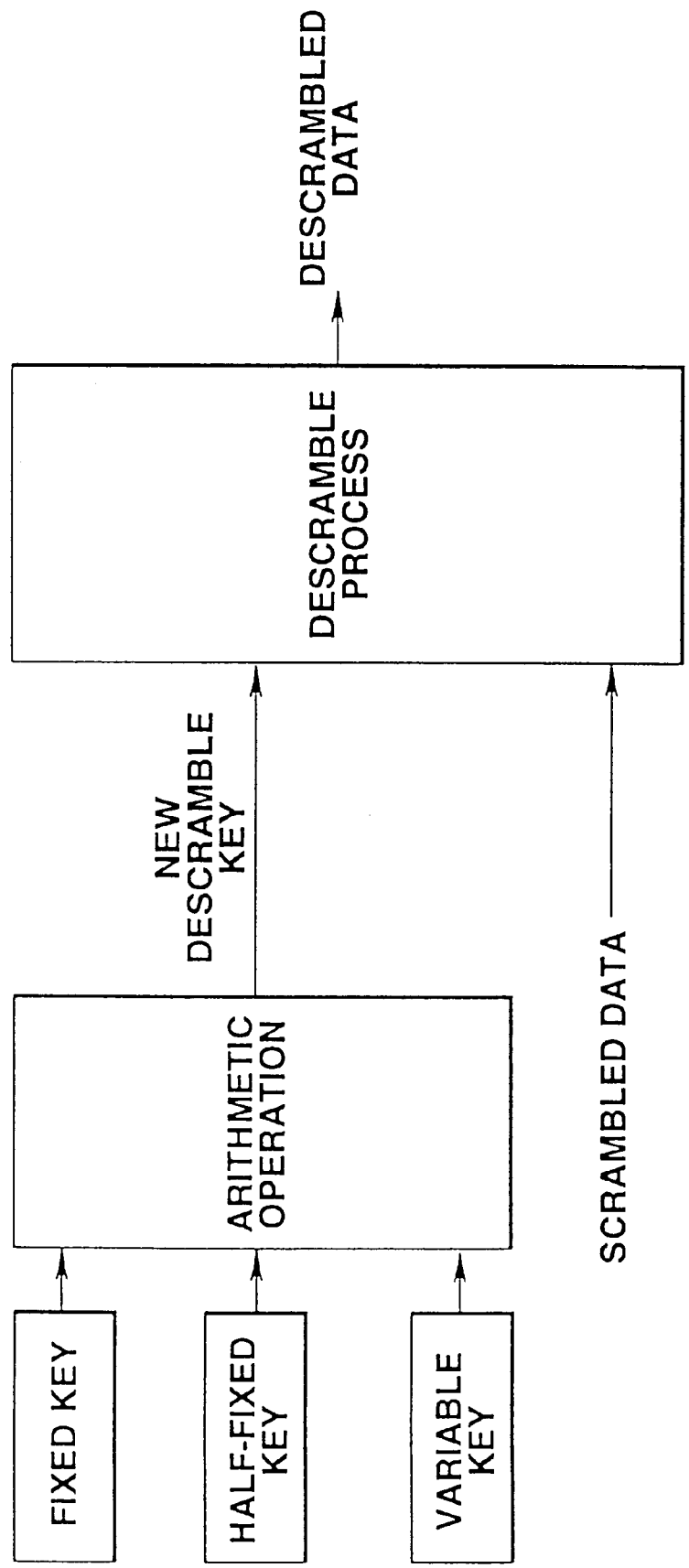
FIG. 14 is a conceptual diagram illustrating a descrambling operation according to the fourth embodiment of this invention.

In this embodiment, at the time charged service information is received, as shown in FIG. 14, a predetermined arithmetic operation is performed step by step using the fixed key stored in the ROM 44, the half-fixed key read from the IC card 2 and the variable key in the top packet of the received charged service information to prepare a new descramble key, a descrambling process is performed on scrambled charged service information by using the prepared descramble key, thus obtaining descrambled charged service information. The sequence of procedures is illustrated in FIG. 15.

Figure 15:
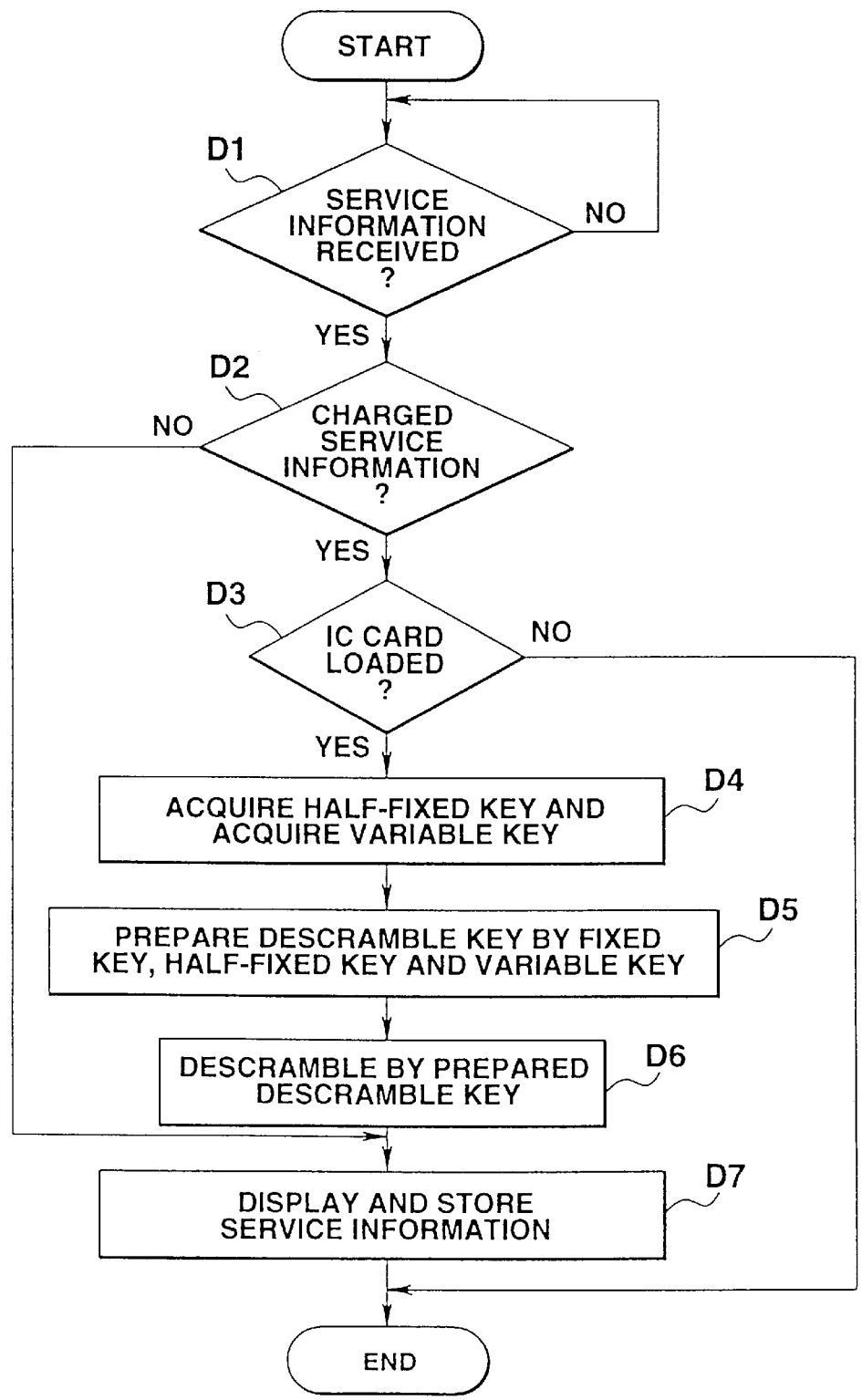
FIG. 15 is a flowchart illustrating the operation of a service information receiving apparatus according to this embodiment.

FIG. 15 exemplifies the operation that the control section 43 performs based on the processing programs stored in the ROM 44 at the time of receiving service information. At the beginning, the control section 45 waits for the reception of service information, regardless of whether it is charged or charge-free type (step D1). After the reception of service information is determined, it is then determined whether or not the service information is charged one by checking a charge code is present in the data block of the packet (step D2).

When it is determined that the charge code is not present in the associated field and a charge-free code is placed there instead so that the received service information is free, not charged, the service information is not scrambled. Therefore, the charge-free service information is sequentially sent directly to the display section 7 to be displayed and is also stored in the reception data memory 47 (step D7).

When it is determined in the aforementioned step D2 that the charge code is located at the associated position and the received service information is charged, it is then determined if the IC card 2 is loaded (step D3).

When it is determined that no IC card 2 is loaded, the half-fixed key cannot be read from the IC card 2, disabling the preparation of a new descramble key to be used to descramble the scrambled charged information, so that this reception process is terminated.

When it is determined that the IC card 2 is loaded, on the other hand, the half-fixed key is read from the IC card 2 via the card processing section 45 and a variable key following the charge code in the top packet of the received charged service information is fetched (step D4).

Then, a new descramble key for descrambling scrambled information is prepared by using the fixed key stored in the ROM 44 and the acquired half-fixed key and variable key (step D5), and descrambling of received charged service information is performed using the prepared descramble key to thereby acquire descrambled charged service information (step D6). Then, the thus acquired charged service information is sequentially sent to the display section 7 to be displayed and is also stored in the reception data memory 47 (step D7). This processing is then terminated.

In short, a new descramble key is prepared by using the fixed key prestored in the ROM 44, the half-fixed key read from the IC card 2 loaded into the service information receiving apparatus 1 and the variable key affixed to received charged service information, and descramble processing is executed using this prepared descramble key to acquire descrambled charged service information. It is therefore possible to surely prevent unauthorized viewing of charged service information.

Fifth Embodiment

With reference to the accompanying drawings, a description will now be given of the fifth embodiment of this invention as adapted to an FM teletext broadcasting system.

The general system structure, the structure of the service information receiving apparatus, the structure of an IC card to be loaded into this apparatus, the structure of the service information transmitting apparatus which is located in an FM broadcasting station and the transmission signal format of service information to be multiplexed on an FM broadcast radio wave are the same as those illustrated in FIGS. 1 through 7 except that no IC card is used in this embodiment. To avoid the redundant description, therefore, like or same reference numerals are given to those components which are the same as the corresponding components of the first embodiment.

It is assumed that the fixed key 44a, one of descramble keys which is used together with the variable key affixed to the received charged service information to descramble charged service information is stored in advance in the ROM 44 in the service information receiving apparatus 1 as indicated by a broken line in FIG. 4. The fixed key 44a consists of a first fixed key and a second fixed key.

The operation of the fifth embodiment will be described below.

Figure 16:
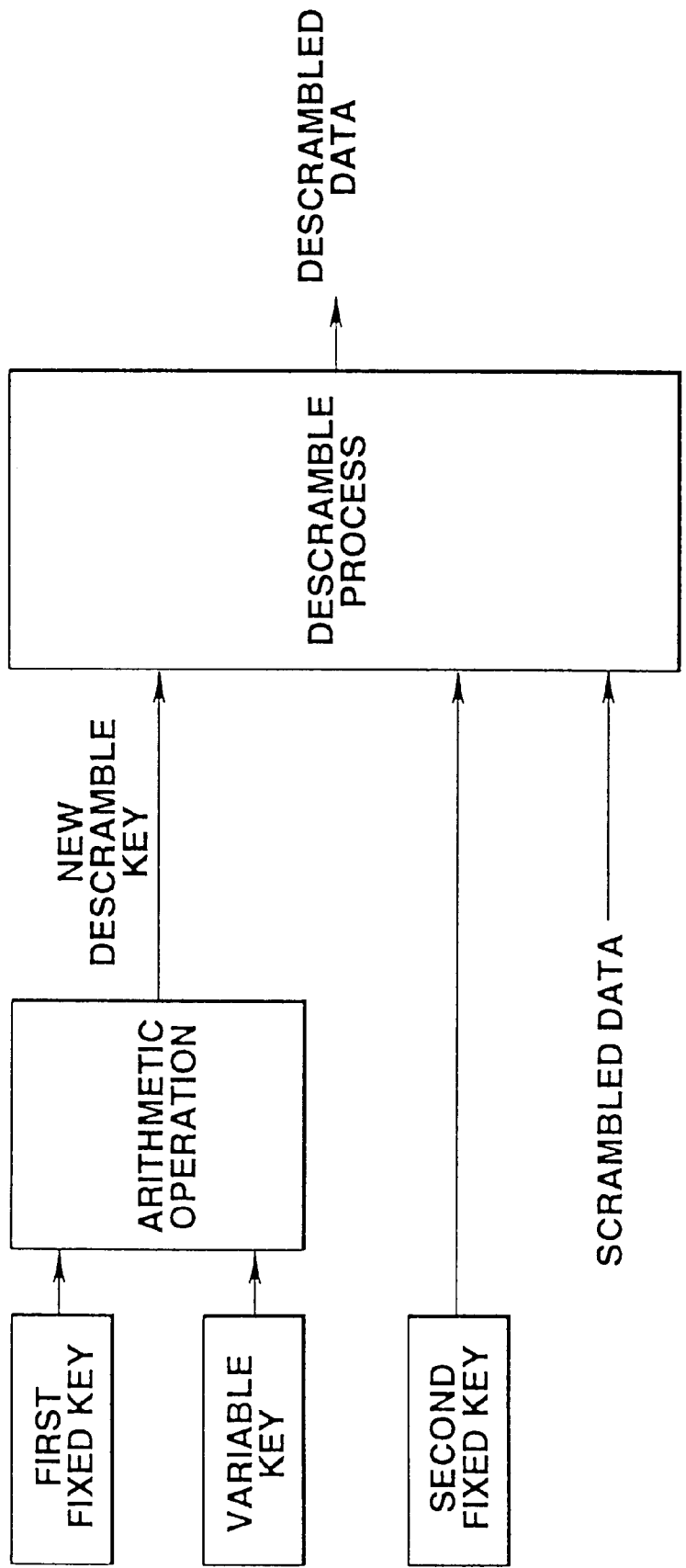
FIG. 16 is a conceptual diagram illustrating a descrambling operation according to the fifth embodiment of this invention.

In this embodiment, at the time charged service information is received, as shown in FIG. 16, a predetermined arithmetic operation is performed using the first fixed key stored in the ROM 44 and the variable key in the top packet of the received charged service information to prepare a new descramble key, descrambling is executed step by step using this prepared descramble key and the second fixed key stored in the ROM 44 to descramble the scrambled charged service information. As a result, descrambled charged service information is acquired. The sequence of procedures is illustrated in FIG. 17.

Figure 17:
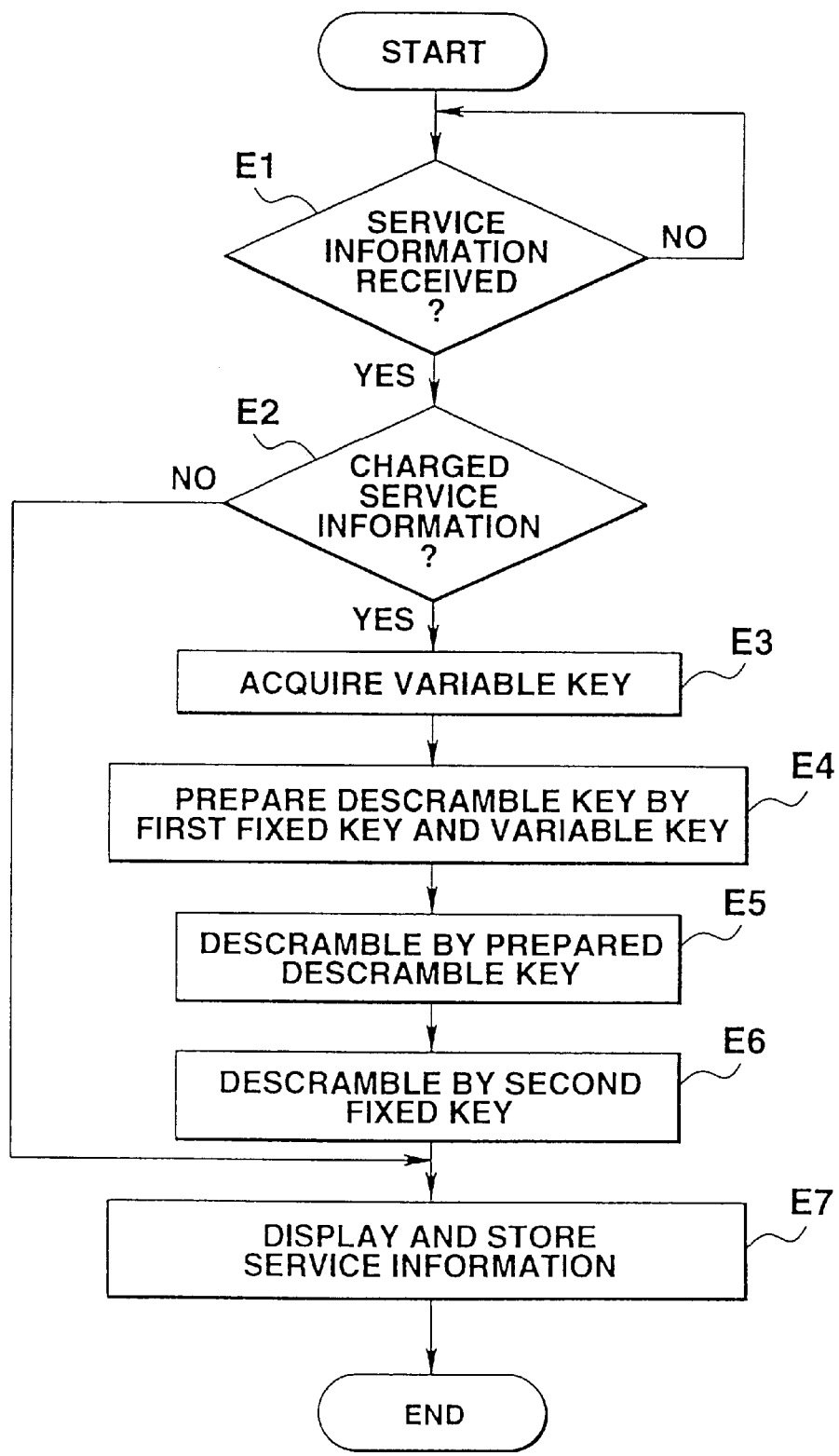
FIG. 17 is a flowchart illustrating the operation of a service information receiving apparatus according to this embodiment.

FIG. 17 exemplifies the operation that the control section 43 performs based on the processing programs stored in the ROM 44 at the time of receiving service information. At the beginning, the control section 45 waits for the reception of service information, regardless of whether it is charged or charge-free type (step E1). After the reception of service information is determined, it is then determined whether or not the service information is charged one by checking a charge code is present in the data block of the packet (step E2).

When it is determined that the charge code is not present in the associated field and a charge-free code is placed there instead so that the received service information is free, not charged, the service information is not scrambled. Therefore, the charge-free service information is sequentially sent directly to the display section 7 to be displayed and is also stored in the reception data memory 47 (step E8).

When it is determined in the aforementioned step E2 that the charge code is located at the associated position and the received service information is charged, the variable key following the charge code in the top packet of the received charged service information is fetched (step E3).

Then, a predetermined arithmetic operation is executed using the first fixed key stored in the ROM and the variable key to prepare a new descramble key (step E4), and a first descrambling process is performed on the received charged service information using this prepared descramble key (step E5).

Further, a second descrambling process is performed using the second fixed key stored in the ROM 44 to acquire completely descrambled charged service information (step E6). Subsequently, the acquired charged service information is sequentially sent to the display section 7 to be displayed and is also stored in the reception data memory 47 (step E7), then this processing is terminated.

As apparent from the above, a new descramble key is prepared by using the first fixed key prestored in the ROM 44 and the variable key affixed to the received charged service information, and descramble processing is executed step by step using this prepared descramble key and the second fixed key stored in the ROM 44 to finally acquire descrambled charged service information. It is therefore possible to surely prevent unauthorized viewing of charged service information.

A process of transmitting charged service information in the service information transmitting apparatus 70 according to the fifth embodiment, though omitted in the foregoing description of the first to fourth embodiments, will be discussed below with reference to the accompanying drawings.

At the time scrambling of charged service information is executed by the data processing section 72 in the service information transmitting apparatus 70, the aforementioned variable, first fixed key and second fixed key are used as scramble keys.

Figure 18:
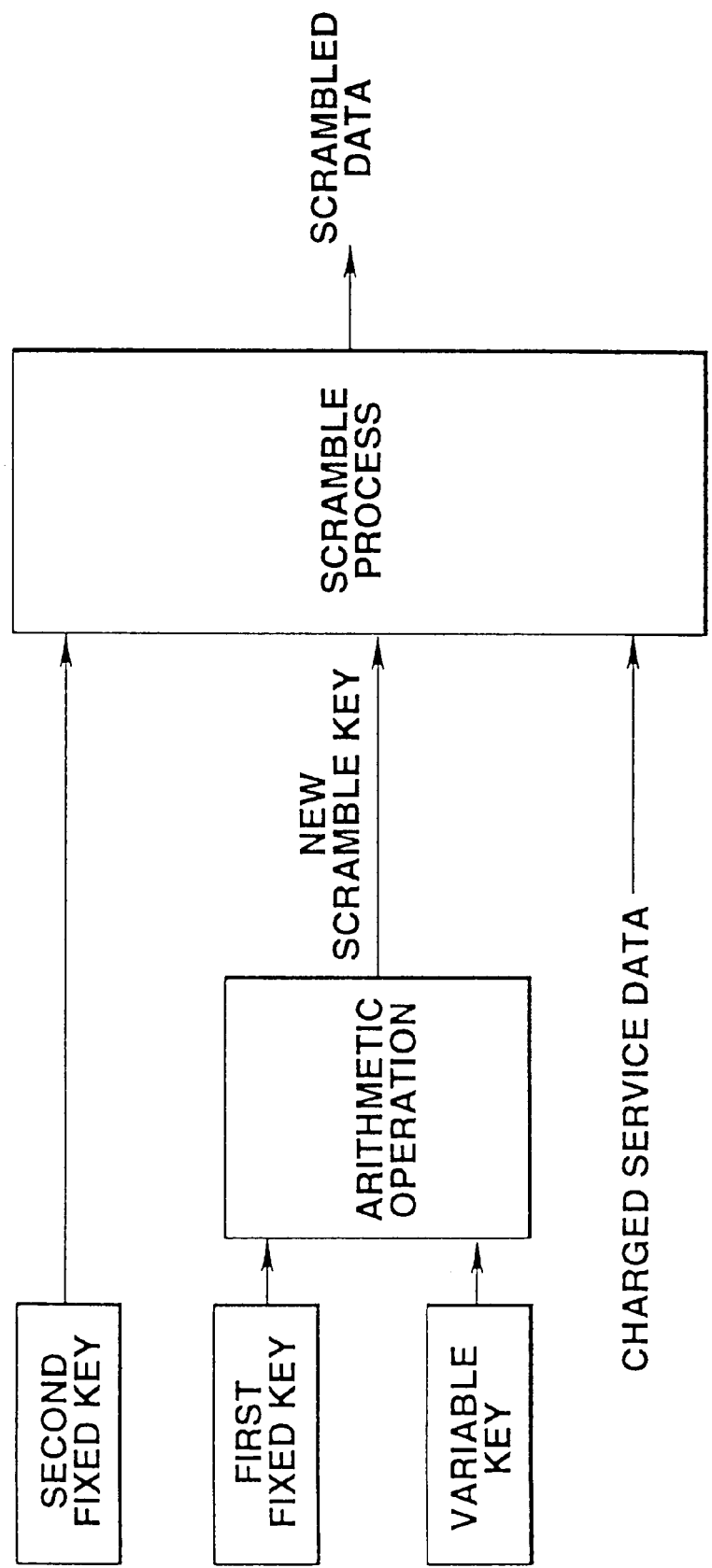
FIG. 18 is a conceptual diagram illustrating a scrambling operation according to this embodiment.
Figure 19:
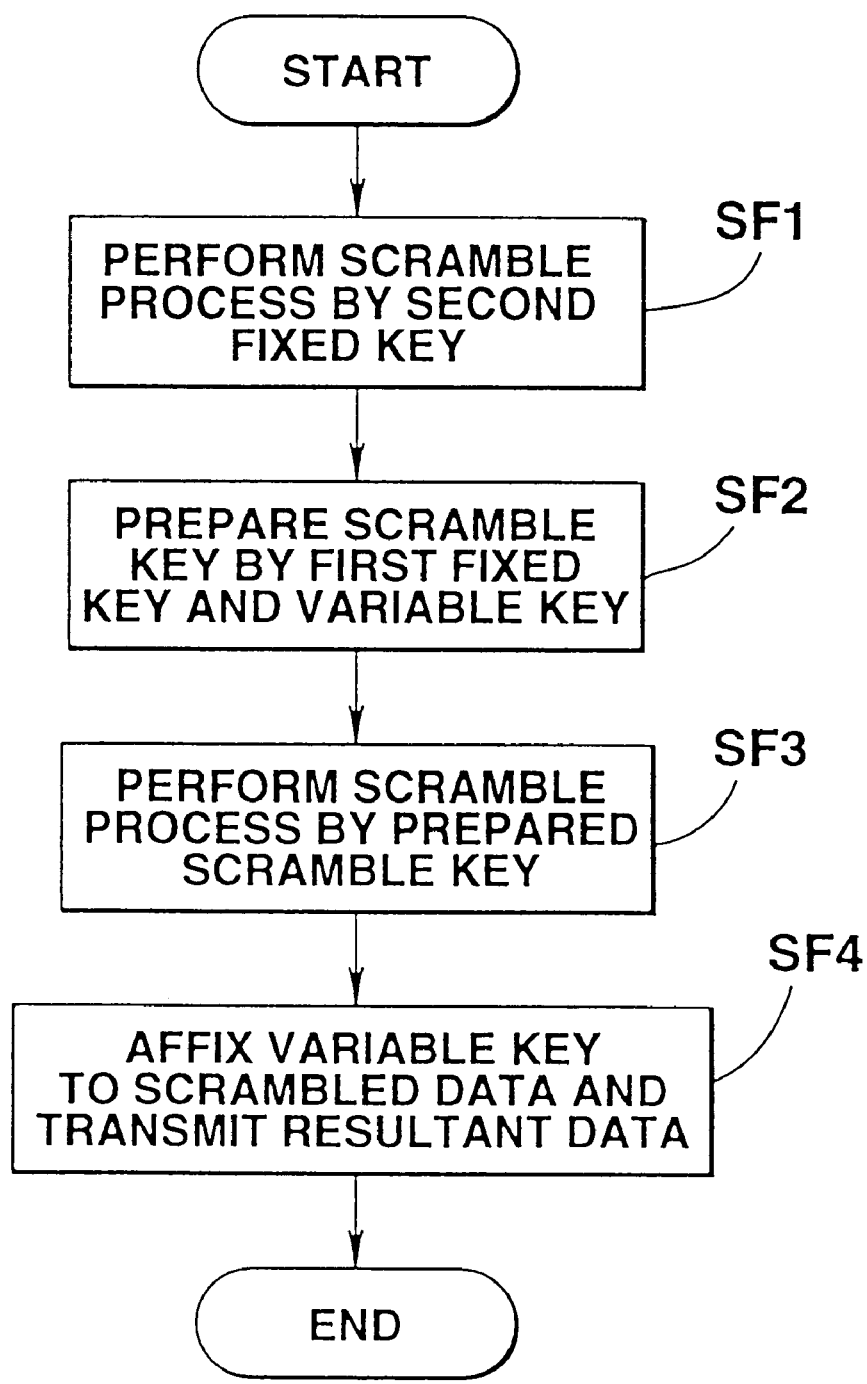
FIG. 19 is a flowchart illustrating the operation of a service information transmitting apparatus according to this embodiment.

At the time charged service information is transmitted in this embodiment, as shown in FIG. 18, scramble processing is executed step by step by using the second fixed key and a new scramble key, which has been prepared by performing a predetermined arithmetic operation using the first fixed key and the variable key, to descramble charged service information, and then the descrambled charged service information to which a variable key or the like is affixed is transmitted. The sequence of procedures is illustrated in FIG. 19.

FIG. 18 exemplifies the transmission of service information performed by the service information transmitting apparatus 70. At the beginning, first scramble processing is performed on charged service information input to the data processing section 72 using the second fixed key (step SF1).

Further, a predetermined arithmetic operation is performed using the first fixed key and variable key to prepare a new scramble key to scramble service information (step SF2), and second scramble processing is performed on the data processed in the first scramble processing by using the prepared scramble key (step SF3).

As shown in FIG. 6, after a program number, a charge code and a variable key are affixed to the head of charged service information undergone the scramble processing and a packet number is affixed to the head of each packet, charged service information is transmitted as an FM broadcast radio wave via the multiplexing section 72 and the transmitting section 71 (step SF4), and then the transmission process is terminated.

In short, scramble processing is executed step by step by using the second fixed key and a new scramble key, which has been prepared by the first fixed key and variable key, a variable key is then affixed to the resultant service information to acquire scrambled charged service information to be transmitted. It is therefore possible to surely prevent unauthorized viewing of charged service information.

Although the foregoing description of the individual embodiments has been given with reference to the case where service information is multiplexed on an FM broadcast radio wave, this invention is not limited to this particular case but can be adapted to various communication and broadcasting systems using wire broadcasting and radio communication.

A storage medium to be installed in the main body of the receiving apparatus may take other forms than an IC card, such as a coin-like chip, a stamp-like IC chip and a card having a bar code printed thereon.

Although an arithmetic operation is performed using a plurality of descramble keys to prepare a new descramble key in the above-described embodiments, a simple converting process or the like may be used as long as a plurality of descramble keys are used to prepare a new descramble key.

A descramble key to be affixed to scrambled charged service information which is to be transmitted from the transmission side may be altered not only in accordance with the date and time or the like but also in accordance with other various conditions. In this case, even if the descramble key is decoded through an unauthorized manner on the reception side, the transmission side can alter a descramble key to be affixed to scrambled charged service information to be transmitted, thus changing the descramble key on the reception side. This can prevent an unauthorized use of the descramble key.

The position of the descramble key in each packet of charged service information to be transmitted is not limited to the head of the packet, but may be changed as needed.

Therefore, the present examples and embodiments are to be considered as illustrative and not restrictive and the invention is not to be limited to the details given herein, but may be modified in various forms within the scope of the appended claims.

What is claimed is:

1. An FM teletext broadcast receiving apparatus (1) comprising:

reception means (31, 32, 33, 41) for receiving charge-free information and scrambled charged information transmitted in such a form as to be multiplexed on an FM broadcast radio wave;

descramble means (43) for descrambling said charged information received by said reception means (31, 32, 33, 41) using a plurality of descramble keys for descrambling information; and display means (7) for displaying said charged information descrambled by said descramble means (43) and said charge-free information received by said reception means (31, 32, 33, 41).

2. The FM teletext broadcast receiving apparatus (1) according to claim 1, wherein said reception means (31, 32, 33, 41) includes means (31, 32, 33, 41) for receiving a descramble key transmitted in such a form as to be multiplexed on an FM broadcast radio wave; and at least one of said plurality of descramble keys is said descramble key received by said reception means (31, 32, 33, 41).

3. The FM teletext broadcast receiving apparatus (1) according to claim 1, further comprising a receiving apparatus main body (1A) to and from which a storage medium (2) having stored a descramble key is attachable and detachable; and wherein at least one of said plurality of descramble keys is said descramble key stored in said storage medium (2).

4. The FM teletext broadcast receiving apparatus (1) according to claim 1, further comprising storage means (44), provided in a receiving apparatus main body (1A), for previously storing a descramble key (44a); and wherein at least one of said plurality of descramble keys is said descramble key (44a) stored in said storage means (44).

5. An information receiving apparatus (1) comprising:

reception means (31, 32, 33, 41) for receiving scrambled information;

a receiving apparatus main body (1A) to and from which a storage medium (2) having stored a descramble key for descrambling said scrambled information is attachable and detachable;

descramble means (43) for descrambling said scrambled information received by said reception means (31, 32, 33, 41) by using a plurality of descramble keys including said descramble key stored in said storage medium (2); and display means (7) for displaying said information descrambled by said descramble means (43).

6. The information receiving apparatus (1) according to claim 5, further comprising storage means (44), provided in a receiving apparatus main body (1A), for previously storing a descramble key (44a); and wherein at least one of said plurality of descramble keys is said descramble key (44a) stored in said storage means (44).

7. The information receiving apparatus according to claim 5, wherein said descramble means (43) includes descramble key preparing means (43) for performing a predetermined process by using two or more of said plurality of descramble keys to prepare a new descramble key; and said descramble key prepared by said descramble key preparing means (43) is used to descramble said scrambled information.

8. The information receiving apparatus according to claim 5, wherein said reception means includes means for receiving a descramble key, and at least one of said plurality of descramble keys is said descramble key received by the reception means.

9. An information receiving apparatus (1) comprising:

reception means (31, 32, 33, 41) for receiving scrambled information and a first descramble key for descrambling said scrambled information;

a receiving apparatus main body (1A) to and from which a storage medium (2) having stored a second descramble key for descrambling said scrambled information is attachable and detachable;

storage means (44) provided in the receiving apparatus main body (1A), for fixedly storing in advance a third descramble key (44a) for descrambling said scrambled information;

descramble means (43) for descrambling said scrambled information received by said reception means (31, 32, 33, 41) by using a plurality of descramble keys including said first descramble key received by the reception means, said second descramble key stored in the storage medium and said third descramble key stored in the storage means; and display means (7) for displaying said information descrambled by said descramble means.

10. The information receiving apparatus (1) according to claim 9, wherein said descramble means (43) includes descramble key preparing means (43) for performing a predetermined process by using two or more of said plurality of descramble keys to prepare a new descramble key; and said descramble key prepared by said descramble key preparing means (43) is used to descramble said scrambled information.

11. An information receiving apparatus (1) comprising:

reception means (31, 32, 33, 41) for receiving scrambled information;

descramble means (43) for descrambling said scrambled information received by said reception means (31, 32, 33, 41) by using a plurality of descramble keys, said descramble means (43) including descramble key preparing means (43) for performing a predetermined process by using two or more of said plurality of descramble keys to prepare a new descramble key, which is used to descramble said scrambled information; and display means (7) for displaying said information descrambled by said descramble means.

12. The information receiving apparatus (1) according to claim 11, wherein said reception means (31, 32, 33, 41) has means (31, 32, 33, 41) for receiving a descramble key; and at least one of said plurality of descramble keys is said descramble key received by said reception means (31, 32, 33, 41).

13. The information receiving apparatus according to claim 11, further comprising a receiving apparatus main body (1A) to and from which a storage medium (2) having stored a descramble key is attachable and detachable; and wherein at least one of said plurality of descramble keys is said descramble key stored in said storage medium (2).

14. The information receiving apparatus (1) according to claim 11, further comprising storage means (44), provided in a receiving apparatus main body (1A), for previously storing a descramble key (44a); and wherein at least one of said plurality of descramble keys is said descramble key (44a) stored in said storage means (44).

15. An information transmitting apparatus (3) comprising:

scramble means (72) for scrambling information by using a plurality of scramble keys, said scramble means including scramble key preparing means (72) for performing a predetermined process by using two or more of said plurality of scramble keys to prepare a new scramble key, which is used to scramble information; and transmission means (76, 77) for transmitting scrambled information scrambled by said scramble means (72).

16. An information transmitting and receiving system comprising:

an information transmitting apparatus (3) for transmitting scrambled information and a first descramble key for descrambling said scrambled information;

a storage medium (2) having stored a second descramble key for descrambling said scrambled information; and an information receiving apparatus (1), to which said storage medium (2) is attachable, for receiving said scrambled information and said first descramble key transmitted from said information transmitting apparatus, said information receiving apparatus (1), including, storage means (44) for storing a third descramble key (44a) for descrambling said scrambled information, descramble means (43) for descrambling said received scrambled information by using said first and second descramble keys and said third descramble key (44a) stored in said storage means (44), and display means (7) for displaying information descrambled by said descramble means.

17. The information transmitting and receiving system according to claim 16, wherein said information transmitting apparatus (3) includes scramble means (72) for scrambling information by using said first, second and third descramble keys as first, second and third scramble keys.

18. An information receiving method comprising the steps of:

receiving scrambled information;

reading a descramble key for descrambling said scrambled information from an external storage medium;

descrambling said received scrambled information by using a plurality of descramble keys including said descramble key read from said external storage medium.

19. An information receiving method comprising the steps of:

receiving scrambled information and a first descramble key for descrambling said scrambled information;

reading a second descramble key for descrambling scrambled information from an external storage medium; and descrambling said received scrambled information by using a plurality of descramble keys including said received first descramble key, said read second descramble key and a third descramble key fixedly stored in advance in an internal memory.

20. An information receiving method comprising the steps of:

receiving scrambled information;

performing a predetermined process by using two or more of a plurality of descramble keys to prepare a new descramble key; and descrambling said received scrambled information by using said prepared descramble key.

21. An information transmitting method comprising the steps of:

performing a predetermined process by using two or more of a plurality of scramble keys to prepare a new scramble key;

scrambling information by using said prepared scramble key; and transmitting said scrambled information.

22. A storage medium, attachable to and detachable from an information receiving apparatus for receiving scrambled information, comprising:

storage means for storing a plurality of descramble keys for descrambling said scrambled information received by said information receiving apparatus, except for at least one of said plurality of descramble keys; and interface means for interfacing with said information receiving apparatus, wherein said at least one of the descramble keys not stored in the storage means is one of a descramble key received by the information receiving apparatus and a descramble key fixedly stored in advance in a main body of the information receiving apparatus.

23. An information receiving apparatus comprising:

reception means for receiving scrambled information;

descramble means for executing a descrambling operation on the scrambled information received by the reception means a plurality of times by using a plurality of descramble keys; and display means for displaying the information subjected to the descrambling operation by the descramble means the plurality of times.

24. The information receiving apparatus according to claim 23, wherein said descramble means comprises:

first descramble means for executing a first descrambling operation on the scrambled information received by the reception means, by using a first descramble key for descrambling;

second descramble means for executing a second descrambling operation on the information subjected to the first descrambling operation by the first descramble means, by using a second descramble key for descrambling; and third descramble means for executing a third descrambling operation on the information subjected to the second descrambling operation by the second descramble means, by using a third descramble key for descrambling, and wherein said display means displays the information subjected to the third descrambling operation by the third descramble means.

25. The information receiving apparatus according to claim 23, wherein said descramble means comprises:

first descramble means for executing a first descrambling operation on the scrambled information received by the reception means, by using a first descramble key for descrambling; and second descramble means for executing a second descrambling operation on the information subjected to the first descrambling operation by the first descramble means, by using a second descramble key for descrambling, and wherein said display means displays the information subjected to the second descrambling operation by the second descramble means.

26. The information receiving apparatus according to claim 25, further comprising:

descramble key generation means for generating a new descramble key by executing a predetermined operation by use of two or more of said plurality of descramble keys, wherein said first descramble key is a key generated by said descramble key generating means.

27. The information receiving apparatus according to claim 23, wherein said reception means includes means for receiving another descramble key, and at least one of said plurality of descramble keys is said descramble key received by the reception means.

28. The information receiving apparatus according to claim 23, further comprising a receiving apparatus main body to and from which a storage medium having stored therein a descramble key is attachable and detachable.

29. The information receiving apparatus according to claim 23, further comprising storage means provided in a receiving apparatus main body, for fixedly storing in advance a descramble key, wherein at least one of said plurality of descramble keys is said descramble key stored in the storage means.

30. An information transmitting apparatus comprising:

scramble means for executing a scrambling operation on to-be-transmitted information a plurality of times by using a plurality of scramble keys for scrambling; and transmission means for transmitting the to-be-transmitted information subjected to the scrambling operation a plurality of times by the scramble means.

31. The information transmitting apparatus according to claim 30, wherein said scramble means comprises:

first scramble means for executing a first scrambling operation on to-be-transmitted information by using a first scramble key for scrambling; and second scramble means for executing a second scrambling operation on to-be-transmitted information subjected to the first scrambling operation by the first scramble means, by using a second scramble key for scrambling, and wherein said transmission means transmits the to-be-transmitted information subjected to the second scrambling operation by the second scramble means.

32. The information transmitting apparatus according to claim 31, further comprising scramble key generating means for generating a new scramble key by executing a predetermined operation by using two or more of said plurality of scramble keys, wherein said second scramble key is the scramble key generated by the scramble key generating means.

33. The information transmitting apparatus according to claim 32, wherein said transmission means includes means for transmitting the two or more of said plurality of scramble keys which have been used for generating the new scramble key by said scramble key generation means, as descramble keys.

34. The information transmitting apparatus according to claim 30, wherein said transmission means includes means for transmitting at least one of said plurality of scramble keys as a descramble key.

35. The information transmitting apparatus according to claim 30, wherein:

said transmission means includes means for transmitting, except for at least one of the scramble keys, said plurality of scramble keys as descramble keys, and said at least one of the scramble keys which are not transmitted as descramble keys is a descramble key fixedly stored in advance in storage means in a main body of an information receiving apparatus which receives the scrambled information and the descramble keys transmitted by the transmission means.

36. An information receiving method comprising the steps of:

receiving scrambled information; and executing a descrambling operation on the received scrambled information a plurality of times by using a plurality of descramble keys.

37. An information transmitting method comprising the steps of:

executing a scrambling operation on to-be-transmitted information a plurality of times by using a plurality of scramble keys; and transmitting the to-be-transmitted information which has been subjected to the scrambling operation a plurality of times.

* * * * *